United States Patent
Hanson et al.

(10) Patent No.: US 9,802,093 B2
(45) Date of Patent: Oct. 31, 2017

(54) METHOD FOR MANUFACTURING A LACROSSE HEAD POCKET

(71) Applicant: Warrior Sports, Inc., Warren, MI (US)

(72) Inventors: Jessica L. Hanson, Northbridge, MA (US); Adam D. Paquette, Royal Oak, MI (US); Richard J. Janisse, Windsor (CA)

(73) Assignee: Warrior Sports, Inc., Warren, MI (US)

( * ) Notice: Subject to any disclaimer, the term of this patent is extended or adjusted under 35 U.S.C. 154(b) by 112 days.

(21) Appl. No.: 14/957,090

(22) Filed: Dec. 2, 2015

(65) Prior Publication Data

US 2016/0375329 A1     Dec. 29, 2016

Related U.S. Application Data (60) Provisional application No. 62/183,782, filed on Jun. 24, 2015.

(51) Int. Cl.
| | |
|---|---|
| *B29C 45/14* | (2006.01) |
| *A63B 59/20* | (2015.01) |
| *B29C 45/16* | (2006.01) |
| *B29L 31/52* | (2006.01) |

(52) U.S. Cl.
CPC ........ *A63B 59/20* (2015.10); *B29C 45/14426* (2013.01); *B29C 45/1671* (2013.01); *B29C 45/14073* (2013.01); *B29C 45/14467* (2013.01); *B29C 45/14573* (2013.01); *B29C 45/1615* (2013.01); *B29C 2045/1454* (2013.01); *B29C 2045/14122* (2013.01); *B29L 2031/52* (2013.01)

(58) Field of Classification Search
None
See application file for complete search history.

(56) References Cited

U.S. PATENT DOCUMENTS

| | | |
|---|---|---|
| 6,520,875 B1 | 2/2003 | Crawford |
| 6,966,854 B1 | 11/2005 | Gait |
| 6,986,858 B2 * | 1/2006 | Yang ................. B29C 45/1671 264/219 |
| 7,070,523 B1 | 7/2006 | Gait |
| 7,364,519 B1 | 4/2008 | Gait |
| 7,390,275 B1 | 6/2008 | Gait |
| 7,503,859 B1 | 3/2009 | Gait |
| 7,507,171 B2 | 3/2009 | Gait |
| 7,520,828 B2 | 4/2009 | Tucker, Sr. et al. |
| 7,524,253 B1 | 4/2009 | Gait |

(Continued)

*Primary Examiner* — Edmund Lee
(74) *Attorney, Agent, or Firm* — Warner Norcross & Judd LLP (57) ABSTRACT

A lacrosse head pocket includes a plug unit having first and second plugs disposed on a cross lace. The plugs are overmolded by first and/or second runners constructed from a polymeric material so that the plugs are joined with the first and/or second runners. The cross lace extends outwardly from the plug and the overmolded first and/or second runners. Some plug units can have cross laces that cross one another, while other plug units might not include cross laces that cross one another. A method is also provided including: forming a first plug on a first cross lace, placing the first plug in a mold, overmolding a first runner over at least a portion of the plug so the plug and first runner are joined, and optionally overmolding a second plug joined with the cross lace with a second runner or the same first runner.

15 Claims, 8 Drawing Sheets

(56) References Cited

U.S. PATENT DOCUMENTS

| | | | |
|---|---|---|---|
| 7,727,092 B2 * | 6/2010 | Lignelli | A63B 59/20 473/505 |
| 7,815,531 B1 | 10/2010 | Gait | |
| 7,896,761 B2 | 3/2011 | Tucker, Sr. et al. | |
| 7,963,867 B1 * | 6/2011 | Gait | A63B 59/20 473/513 |
| 8,235,846 B2 * | 8/2012 | Winningham | A63B 59/20 473/513 |
| 8,371,966 B2 * | 2/2013 | Winningham | A63B 59/20 473/513 |
| 8,371,967 B2 * | 2/2013 | Winningham | A63B 59/20 473/513 |
| 8,500,577 B2 * | 8/2013 | Winningham | A63B 59/20 473/513 |
| 8,535,034 B2 * | 9/2013 | Hellberg | B29C 45/14426 264/274 |
| 8,727,916 B2 | 5/2014 | Winningham et al. | |
| 9,259,883 B1 * | 2/2016 | Morrow | D05B 1/02 |
| 9,283,699 B2 * | 3/2016 | Morrow | D05B 1/02 |
| 9,427,641 B2 * | 8/2016 | Morrow | D05B 1/02 |
| 9,669,572 B2 * | 6/2017 | Chen | B29C 45/1675 |
| 2004/0029657 A1 | 2/2004 | Scaramussino et al. | |
| 2005/0023726 A1 * | 2/2005 | Yang | B29C 45/1671 264/255 |
| 2008/0214336 A1 | 9/2008 | Lamson et al. | |
| 2008/0268987 A1 * | 10/2008 | Lignelli | A63B 59/20 473/513 |
| 2010/0075785 A1 * | 3/2010 | Winningham | A63B 59/20 473/513 |
| 2011/0160007 A1 * | 6/2011 | Winningham | A63B 59/20 473/513 |
| 2014/0103566 A1 | 4/2014 | Janisse | |
| 2014/0106910 A1 | 4/2014 | Burns et al. | |
| 2014/0106911 A1 | 4/2014 | Burns et al. | |
| 2016/0038802 A1 * | 2/2016 | Morrow | D05B 1/02 473/513 |
| 2016/0038804 A1 * | 2/2016 | Burns | D05B 1/02 473/513 |
| 2016/0038805 A1 * | 2/2016 | Burns | D05B 1/02 473/513 |
| 2016/0039132 A1 * | 2/2016 | Morrow | D05B 1/02 264/103 |
| 2016/0039133 A1 * | 2/2016 | Morrow | D05B 1/02 473/513 |

\* cited by examiner

METHOD FOR MANUFACTURING A LACROSSE HEAD POCKET

BACKGROUND OF THE INVENTION

The present invention relates generally to lacrosse equipment, and more particularly, to a lacrosse head pocket and a related method of manufacture.

Conventional lacrosse sticks include a head joined with a handle. The head includes a frame that forms a region within which a lacrosse ball can be caught, held or shot. A netting structure is joined with the back side of the frame, typically laced through multiple small holes defined by the frame. The netting structure typically forms a pocket within which the ball is held while a player is in possession of the ball, and can be a determinant factor as to the player's ability to catch, retain and shoot the ball.

Many conventional pockets wear out after extensive play, and are subject to change in performance due to climate. The mere thought of replacing a pocket can be daunting to many, particularly younger or less experienced lacrosse players. The reason for this is because most pockets require a complex lacing procedure, which is mastered by only a limited number of individuals, to secure the netting to a lacrosse frame in a desired pocket configuration. Thus, many lacrosse players, particularly youths and newcomers to the sport, are left at the mercy of having to wait for their lacrosse sticks to be restrung by someone else, and even then, after the pocket is strung, they usually must wait several weeks or months until it is properly broken in. In addition, many conventional pockets are constructed from lacing and/or conventional leather thongs. When rained upon, or when heated, these components sometimes can perform differently from ideal conditions, which can present inconsistency in the feel and performance of the pocket.

Some manufacturers have attempted to resolve the above issues, but few have succeeded. A decent approach is implemented in a pocket called the Paramount, commercially available from Warrior Sports, Inc., of Warren, Mich. Certain technology of this pocket is presented in U.S. Pat. No. 8,500,577 to Winningham, hereby incorporated by reference, which generally describes a pre-formed pocket including single layer polymeric runners, which in some cases are joined with one another via cross pieces constructed from a nylon webbing, which is overmolded directly by the single layer runner material. While the Paramount pocket provides an easy-to-install, climate resistant runner pocket, its runners are disposed a fixed distance from one another. In some cases, this can affect the way that a lacrosse ball is caught within or shot from the pocket. In further cases, the pocket is slightly less dynamic, and less able to react to movement of the ball within it. Thus, while the above systems work, there remains room for improvement.

SUMMARY OF THE INVENTION

A lacrosse head pocket that is durable and easy to replace relative to a lacrosse head is provided. A method of making the pocket is also provided.

In one embodiment, the lacrosse head pocket includes a plug unit having first and second plugs disposed on a cross lace. The plugs can be overmolded by first and/or second runners constructed from a polymeric material so that the plugs are inextricably joined with the first and/or second runners.

In another embodiment, the cross lace can extend outwardly from the plug and the overmolded first and/or second runners. Some plug units can have cross laces that cross one another, while other plug units might not include cross laces that cross one another.

In still another embodiment, the plugs can be molded to opposing ends of the cross laces, leaving a central portion of the cross lace exposed and not concealed or covered by the plugs. Optionally, the plugs can be formed as first and second plugs disposed at opposite ends of the cross lace.

In yet another embodiment, the length of cross lace exposed between the respective plugs can vary, depending on the intended location of the plug unit between the scoop and base of a lacrosse head to which the pocket is attached. For example, some plug units can include exposed cross laces between the plugs of a first length, while other plug units can include exposed cross laces between the plugs of a second length, where the second length is greater than the first length or vice versa.

In even another embodiment, the distance by which the plugs are separated along a cross lace can be modified in different regions between the scoop in the base. For example, near the base, the plugs of first plug units can be separated along the cross lace by first distance. Thus, near the base, where the plugs can be attached to respective first and second runners, the runners can separate from one another by the first distance. Near the scoop, the plugs of second plug units can be separated along the cross lace by a second distance, which is greater than the first distance. Thus, near the scoop, where the plugs are attached to the respective first and second runners, the runners can separate from one another by the second distance. Because the second distance is greater than the first distance, in some cases this can provide better grip to the ball as it transitions along the pocket.

In a further embodiment, the pocket can include a first plug unit and a second plug unit, each including respective plugs and cross laces. The cross lace of the first plug unit and the cross lace of the second plug unit can be transverse to one another, crossing over one another in transitioning from a first runner to an adjacent second runner. In these regions as well, the cross laces can be curved as they extend between the first runner and the second runner. Thus, when a ball travels over the first and second plug units, the force generated by the ball can cause the cross laces of the respective first and second plug units to straighten, which operates to separate the first second runners from one another, more than when no ball is present near those plug units.

In still a further embodiment, a method is provided including: forming a first plug on a first cross lace, placing the first plug in a mold, and overmolding a first runner over at least a portion of the plug so the plug and first runner are inextricably joined.

In yet a further embodiment, the method includes forming a second plug on the first cross lace distal from the first plug, placing the second plug in the mold simultaneously with the first plug, and joining the second plug with the first runner by overmolding the second plug with the first runner. In this manner, the cross lace extends outward from the first runner and then back to the first runner. Optionally, a similar return cross lace on a second runner can be interlooped with the first lace to connect the respective first and second runners.

In still a further embodiment, the method includes forming a second plug on the first cross lace distal from the first plug, placing the second plug in the mold simultaneously with the first plug, and joining the second plug with a second runner by overmolding the second plug with the second runner. In this manner, the cross lace extends outward from the first runner toward the second runner and directly joins the first runner with the second runner. Optionally, cross laces of different plug units can be crisscrossed with one another in preselected regions.

In even a further embodiment, the plug units can be joined with the respective first and second runners so that at least a portion of the cross lace is curved and/or rounded as it extends from the first runner to the second runner, or from the first runner back to the first runner. With these curved or rounded sections of the cross lace, the cross lace can straighten when a ball pushes against the first and second runners. When this occurs, the cross lace can enable the runners to move a first distance away from one another to a second, greater distance away from one another.

In yet another further embodiment, the runners can be constructed from a polymeric material, for example, thermoplastic elastomers, such as thermoplastic polyurethane (TPU), thermoplastic copolyester, thermoplastic polyamides, polyolefin blends, styrenic block polymers, and/or elastomeric alloys, as well as rubber, formable but flexible resins, hydrophobic flexible materials, and/or other similar flexible materials. The plugs can be constructed from similar materials, but can have different physical properties from the runners, such as different durometers, tensile strength and/or elasticity.

The lacrosse pocket and method herein provide a lacrosse net structure that is easily replaceable relative to a lacrosse head, even by youth and newcomers to the sport. Multiple different, custom pocket profiles can be formed with the present method, thereby offering a high degree of pocket customization to lacrosse players. Where the material is constructed from hydrophobic or waterproof materials, the pocket is virtually unaffected by weather changes, temperature changes and moisture, which enables it to have a substantially consistent profile and configuration throughout such conditions. Further, due to the plug units and different structures of the cross laces, the runners can dynamically move relative to one another when forces are exerted on the runners by a lacrosse ball within the pocket. In turn, this can provide enhanced ball control and shooting accuracy.

These and other objects, advantages, and features of the invention will be more fully understood and appreciated by reference to the description of the current embodiment and the drawings.

Before the embodiments herein are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

I. Overview

Figure 1:
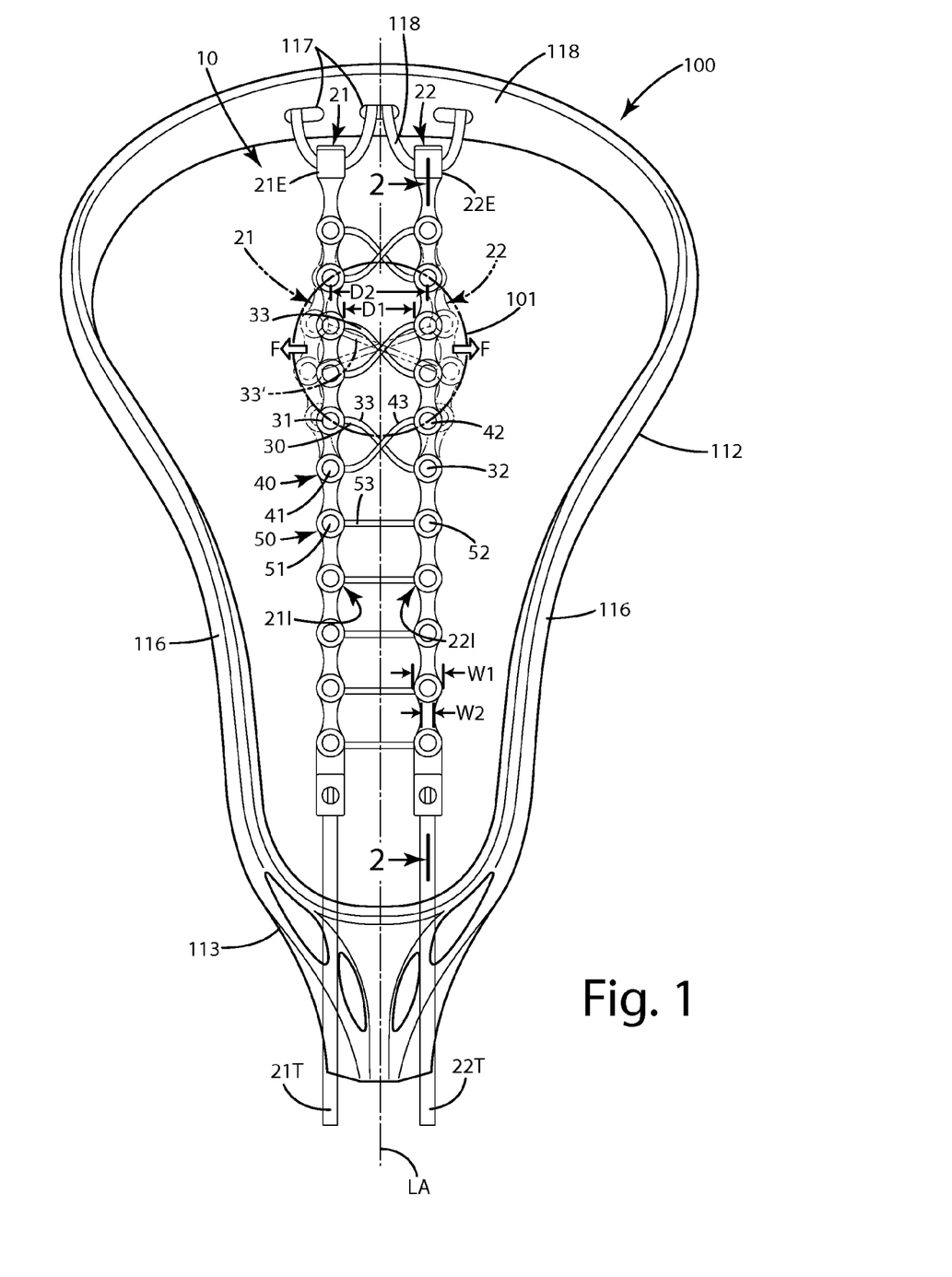
FIG. 1 is a front view of a lacrosse head including a current embodiment of a lacrosse pocket installed thereon.

A current embodiment of a lacrosse head pocket is shown in FIGS. 1-6 and generally designated 10. The lacrosse head pocket 10 is secured to a frame 112 to form a strung lacrosse head 100. The lacrosse head 100 can be further joined with a handle (not shown) to form a lacrosse stick. As shown in FIG. 1, the lacrosse pocket 10 includes first 21 and second 22 runners which are longitudinally disposed along a pocket longitudinal axis LA. Although shown as being generally parallel to the axis LA, the runners 21 and 22 can diverge or converge toward one another, and optionally can change the distances D1 and D2 between these elements as described below.

The respective runners 21, 22 can be formed as elongated unitary, runners overmolded and joined with one or more plug units 30, 40, 50 to hold those units in a fixed position relative to the runners, which in turn secure the first and second runners to one another. The plug units themselves can include first 31, 41, 51 and second 32, 42, 52 plugs that are joined via respective cross laces 33, 43 and 53. The cross laces 33, 43, 53 can be transverse, and optionally perpendicular, to the runners. The cross laces 33 and 43 can be curved or rounded, and attached via plugs to the respective runners in a staggered manner. In some cases the cross laces 33, 43 can cross or extend transversely relative to one another, crisscrossing one another as they extend from the first runner to the second runner. With this combination of crisscrossed and/or rounded or curved cross laces, the runners 21, 22 can dynamically move relative to one another as a lacrosse ball 101 travels along the pocket 10, as explained further below. This can enhance the shooting and catching capabilities of the pocket, and in turn improve the overall confidence of a player using the same.

II. Construction

Construction of the current embodiment of FIGS. 1-7 will now be described. The pocket 10 is described in connection with a women's lacrosse head 100. The pocket, however, can be readily used with men's lacrosse heads. The pocket 10 can be joined with a lacrosse head 100, and in particular, the frame 112, which includes a base 113, a pair of opposing sidewalls 116, and a scoop 118 joining the pair of opposing sidewalls opposite the base. The lacrosse head 100 can include a socket extending rearward from the frame for attachment to a lacrosse handle (not shown). A lacrosse ball 101 can be caught or shot along the pocket 10.

The sidewalls 116 and/or scoop can define multiple netting structure connections 117, which as shown, can be holes that pass through the scoop, sidewalls or the frame. Optionally, the netting structure connections can vary in number, size and location from those shown in the figures. Even further optionally, depending on the application, the netting structure connections can be replaced with other alternative structures, such as a series of hooks or posts (not shown) that allow the attachment ends of the netting structure to be joined with the frame 112.

The pocket 10 can be joined with the frame 112 in a variety of manners. For example, the runners 21, 22 can include throat ties 21T and 22T that can be tied in a conventional manner to the frame 112. The runners 21, 22 also can include upper ends 21E and 22E, each defining a respective hole 21H and 22H that receive secondary lacing 118 to secure those ends to the scoop 118. The pocket 10 can also be connected to the sidewalls and other portions of the frame element 113 via additional net lacing which is looped around the runners 21, 22, extending toward the sidewall, scoop and/or base.

Figure 2:
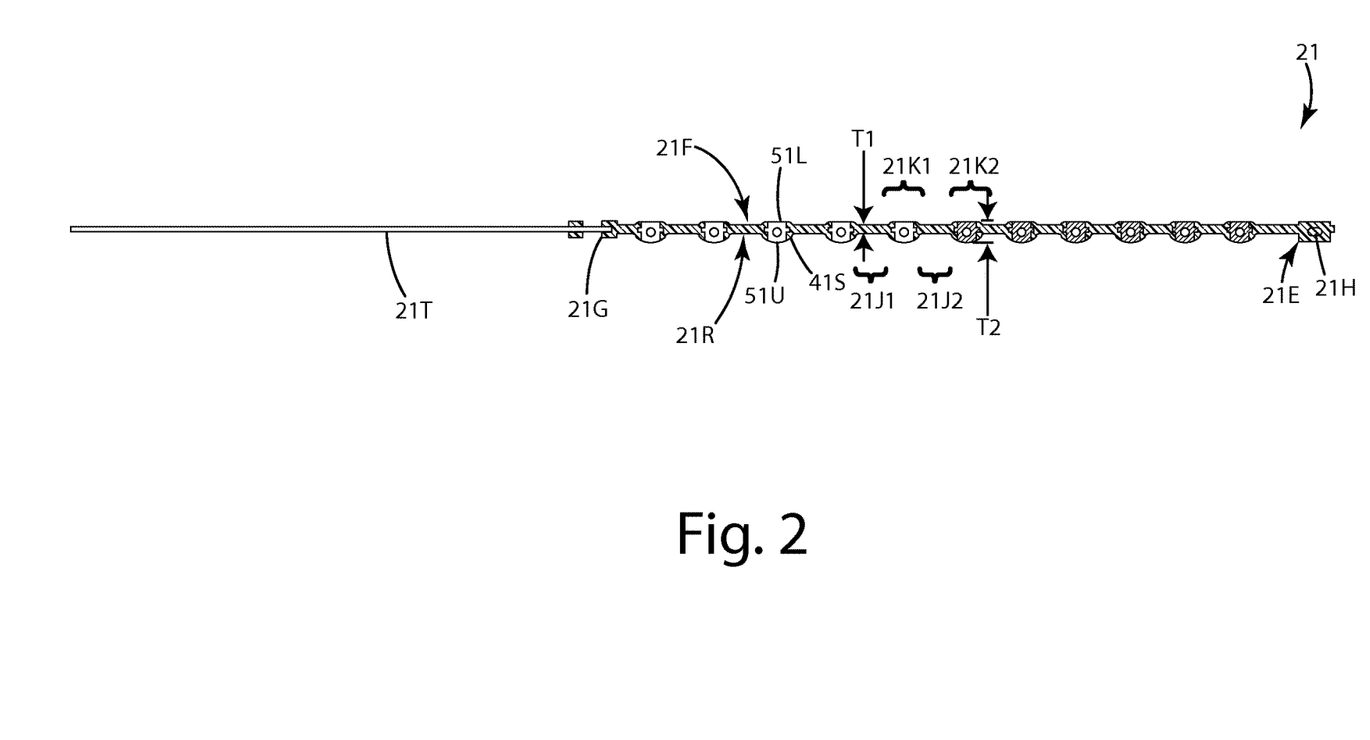
FIG. 2 is a cross section view of the lacrosse pocket taken along line 2-2 of FIG. 1.

With reference to FIG. 2, the runners will be described in more detail. In particular as shown in FIG. 2, only the first runner 21 is illustrated. It will be appreciated that the second runner 22 can be similar to the first runner so the second runner will not be described again here. The first runner 21 can include a first end 21E and a second end 21F distal from one another. The first end 21E can define a first hole 21H, which as mentioned above is configured to receive lacing to attach that end to the frame. The second end 21G can be structured so that it is overmolded over the end of the throat tie 21T, thereby joining the throat tie to the body of the first runner.

The first runner 21 can include a first or front surface 21F and a second or rear surface 21R, as shown in FIG. 2. Usually, the first surface 21F can generally face the front side of the head, so that it can contact the ball 101, while the rear surface 21R can generally face the rear of the head 100, where it does not contact the ball. In some lacrosse activities, however, such as face-off or the draw, the rear surface 21R will contact the ball 101 while a player takes the draw. The first runner 21 also can include an inner surface 21I which faces generally toward the longitudinal axis LA, and also faces toward the inner surface 22I of the second runner 22. All of the first, second and inner surfaces of the runner 21 can extend generally from the first end 21E to the second end 21G of the runner.

The first runner 21 can include multiple different regions along its length, as can the second runner 21. For example, as shown in FIG. 2, the first runner can include multiple join units 21J1, 21J2 which are intermittently disposed along the length of the runner. These join units 21J1 and 21J2 are integrally and monolithically formed with the intersection units 21 K1 and 21 K2, which themselves are intermittently disposed among the join units along the length of the runner 21. As further described below, these intersection units contain or otherwise are joined with portions of plug units. Generally, due to this inclusion of the portions of the plug units within the intersection units, the intersection units 21 K1 and 21 K2 can be of a width W1 that is greater than a width of the join units W2 as illustrated in FIG. 1. This can promote weight savings yet still adequately anchor the plugs of the respective plug units within the material from which the runner is constructed. The width W1 can in some cases be twice the width W2, or some other multiple. As an example W1 can be 10 mm and W2 can be 5 mm. In addition, by having a slight taper in the surfaces of the intersection units at width W1, there can be more pocket flexibility when the pocket is moving from front to back, or in a throwing/catching motion of the pocket.

As shown in FIG. 2, the first runner 21 can include different thicknesses, as can the second runner. For example, the join units 21J1 and 21J2 can define thicknesses T1. In contrast, the intersection units 21 K1 and 21 K2 can define thicknesses T2. The thickness T2 can be approximately twice the thickness T1. As an example, the thickness T2 can be about 5 mm to about 10 mm, while the thickness T2 can be about 2 mm to about 4 mm. The increased thickness T2 can effectively accommodate the height of a respective plug of a plug unit that is overmolded by the first runner or second runner.

The first runner 21 from the scoop end 21E to the throat tie end 21G can generally be of a length suitable for the appropriate lacrosse head, generally ranging from optionally 22 centimeters to 28 centimeters, further optionally from 23 centimeters to 25 centimeters, and further optionally 24 centimeters. Of course other dimensions may be suitable, depending on the application.

The cross section of the runners taken perpendicular to the longitudinal axis LA also can vary. For example, the runners can be rectangular with rounded edges in the region of the join units 21J1, 21J2. In the region of the intersection units 21 K1, 21 K2, the cross section can be generally rectangular, with the upper and lower surfaces being convex or concave if desired. Of course, these cross sections can be of a variety of other shapes, including circular, triangular, square, diamond shaped, polygonal or irregular shapes.

The first and second runners can be constructed from a variety of polymeric materials, which include, but are not limited to, elastomeric materials, such as the thermoplastic polymers, thermoplastic polyurethane, thermoplastic resins, thermoplastic copolyesters, thermoplastic polyamides, polyolefin blends, styrenic block polymers, and elastomeric alloys, as well as rubber, formable but flexible resins, hydrophobic flexible materials, or similar flexible materials, or combinations of the foregoing. Where the material is hydrophobic, the runners and the resulting pocket can be resistant to shrinkage or shape alteration due to moisture, and in many cases changes in ambient temperature.

Optionally, the entire structure of each runner is formed from a single, monolithic piece of polymeric material, having different thicknesses and cross sections of components as desired.

As shown in FIGS. 1 and 2, each of the respective runners 21, 22 can be joined directly with the respective plug units 30, 40, 50. This is accomplished via the plugs 31, 41, 51 being overmolded by the first runner, and in particular the polymeric material for which the first runner is constructed, and the plugs 32, 42, 52, likewise being overmolded by the second runner. As used herein, the term overmolded can refer to insert overmolding, in which one polymeric material, sometimes elastomeric, is molded over a second substrate material (optionally a plug and/or cross lace herein), which can be in the form of a rigid already formed object. Further, when an object, such as a plug, is considered overmolded by another object, such as a runner, it is considered that this provides a structural relationship between the parts, rather than simply a process by which the parts are joined. For example, a plug or plug unit overmolded by a runner is joined at a plug/runner interface having a high level of molecular adhesion between these components. The runner thereby is mechanically joined with the plug or plug unit, and also can be joined directly with the plug or plug unit on a molecular level at the interface of the runner and plug or plug unit.

The plug units, and their respective components such as the plugs and cross laces will now be described in further detail. Optionally, a pocket constructed in accordance with the embodiments herein can include different combinations of plug units 30, 40 and 50 as described above in combination. Of course, a pocket can also be constructed so that it includes only one of these different types of plug units. For example, a pocket can include only plug units 50, only plug units 40 and/or only plug units 30. Alternatively, additional types of plug units can be formed and included in the constructions. It is also contemplated herein that when the plug units are formed, the plugs themselves can be formed along different portions of the cross lace. For example, instead of being formed at a terminal end, a cross lace, a plug can be formed about a third of the distance between a first end and a second end, while another plug can be formed about two thirds of the distance between that first end and second end. Plugs can generally be formed anywhere along the cross lace in those, depending on the particular application.

Figure 4:
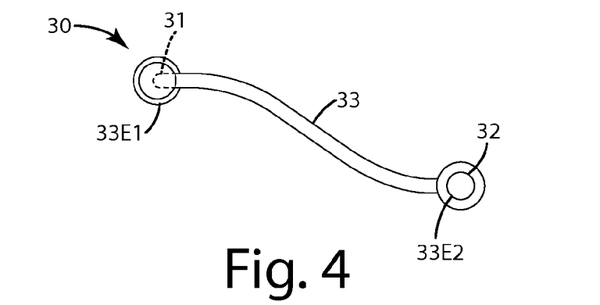
FIG. 4 is a close-up view of a first cross lace in a curved configuration.

Referring to FIG. 1, there can be different constructions for the respective plug units 30, 40 and 50. As an example, the unit 30, as shown in FIG. 4, can include a first plug 31 and a second plug 32. These plugs are joined via the first cross lace 33. In particular, the first end 31 E1 of the cross lace is overmolded by the first plug 31. The second end 33E2 is overmolded by the second plug 32. Accordingly, each of the respective plugs are in inextricably joined with the cross lace, and unable to be removed therefrom without damaging the structure of one or both of these components.

Figure 5:
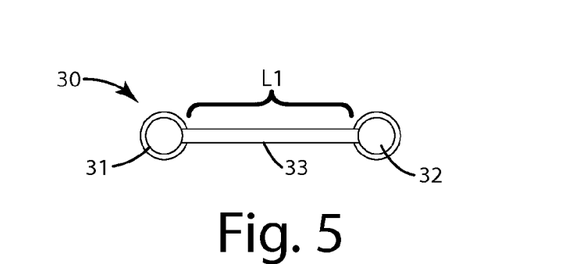
FIG. 5 is a close-up view of the first cross lace in a straightened configuration.

This plug unit 30 can be constructed so that the cross lace separated the first plug 31 and the second plug 32, as shown in FIG. 5, by predetermined distance L1. This distance L1 illustrates the plug unit in a straightened configuration. When installed within the pocket 10 and joined with the respective first and second runners 21, 22, however, the cross lace 33 attains the rounded or curved shape shown in FIG. 4 and FIG. 1. This rounded shape can be an S-shape or a reverse S-shape. It will be appreciated that when the plugs 31 and 32 are moved away from one another, the S-shape straightens from the configuration shown in FIG. 4, more toward an elongated configuration shown in FIG. 5 as described in further detail below.

Figure 6:
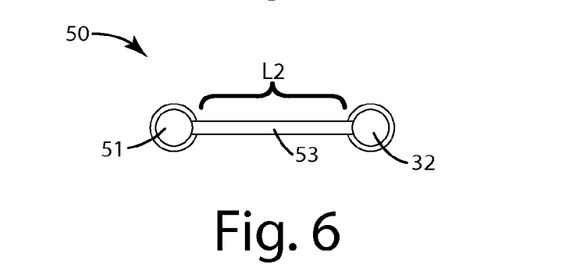
FIG. 6 is a close-up view of a second cross lace in a straightened configuration.

As noted above, the plug units 30 and 50 can be different from one another. This can be due to the differences in the lengths of the respective cross laces between plugs in a plug unit. In FIG. 6, plug unit 50 includes a cross lace 53 extending between a first plug 51 and a second plug 52. The length L2 of this cross lace 53 can be less than the length L1. For example, the length L2 extending between the respective first and second plugs 51 and 52 can be 1, 2, 3, 4, 5, 10 mm shorter than the length L1 of the cross lace 33 extending between the respective first and second plugs 31 and 32. This shorter length L2 can provide a relatively fixed distance between the first and second plugs 51 and 52 along a portion of the pocket near the base or middle of the pocket. Thus, a ball 101 traveling along the respective first and second runners 21, 22 generally will not push those first and second runners away from one another, changing the distance between the runners.

In contrast, with the rounded or curved configuration of the cross lace 33 in the plug unit 30, near the ramp of the pocket 10 and/or the scoop 118 of the head 100, that type of cross lace can convert from the rounded or S-shape configuration to a more straightened configuration of the cross lace 33' as shown in broken lines in FIG. 1. This conversion or straightening of the cross lace can occur when a lacrosse ball 101 exerts forces on the respective first and second runners 21 and 22, thereby forcing those runners to separate from one another. This is further illustrated in FIG. 1, where in an unloaded state, the first cross lace 33 and second cross lace 43 maintain the runners at a distance D1 from one another. This distance D1 can be achieved when a ball is not resting adjacent these cross laces or where the stick is generally static. However, these cross laces 33 and 34 can convert from the rounded or curved shape shown in FIGS. 1 and 4 to a generally straightened shape shown in broken lines, for example at 33' in FIG. 1, particularly when a lacrosse ball 101 rolls or is forcibly shot along the pocket 10. The forces F from the ball on the runners push the runners outward, away from one another, and generally away from the pocket longitudinal axis LA. In this manner, the runners separate from one another to a dynamic or extended distance D2 from the static distance D1. This allows runners and thus the pocket to dynamically guide the ball along the pocket. When the ball passes beyond those cross laces, or otherwise exits the head, the runners no longer have the force of the ball F being exerted thereupon. Therefore, the runners return to a static state in which the cross laces 33 and 43 retain their generally rounded or curved shapes, and the runners reattain the static distance D1 therebetween.

The plug units 50 can operate differently from the above plug units 30, 40. Plug units 50 can maintain the runners generally consistently at the distance D1 from one another. This distance D1 can be maintained via the cross lace 53 of the length L2 (FIG. 6), even when the lacrosse ball 101 exerts forces F upon the runners 21, 22. This is because the cross lace 53 of the plug units 50 generally extends perpendicular to the pocket longitudinal axis LA of the pocket 10. Thus, there is no slack or slack that can be taken up along the length L2 of the cross lace 53 to enable the runners to move away from one another.

Figure 6A:
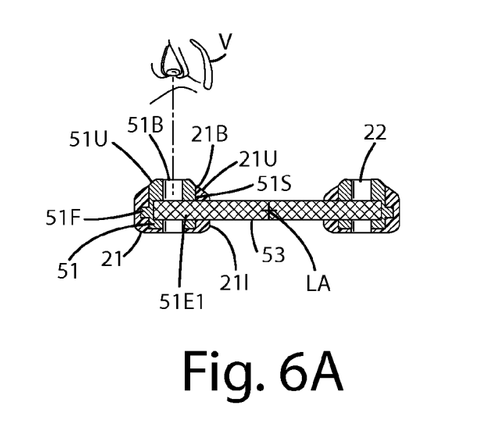
FIG. 6A is a cross-section view of the second cross lace overmolded by plugs and first and second runners of the pocket.
Figure 6B:
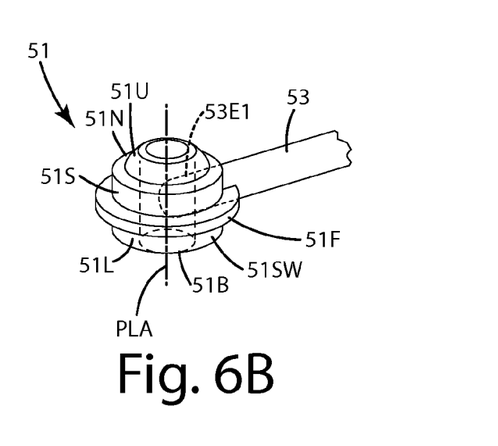
FIG. 6B is a close-up view of a plug of a plug unit of the pocket.

Returning to the plugs of the plug units themselves, reference is made to FIGS. 6A and 6B. In these figures, the plugs 51 and 52 are described in connection with the plug units 50. However, it will be understood that the plugs of this plug unit can be utilized equally in any of the other types of plug units described herein. As shown in FIG. 6B, a first plug 51 is shown. It further will be appreciated that the opposing second plug 52 can be similar or identical to this plug, but reversed in construction. The first plug 51 can include an upper surface 51U and a lower surface 51L. These surfaces are joined and transition to with a side surface 51S. The side surface optionally can form a cylindrical shape. Alternatively, although now shown, this side surface 51S can form a spherical shape or other irregular, or polygonal shape depending on the application. The upper surface 51U can transition at a shoulder 51N directly to the side surface. Optionally, the upper surface 51U can be flat, convex and/or concave. Likewise, the lower surface 51L can be convex, concave or flat, depending again on the application. Optionally, the upper surface 51U can be shaped differently from the lower surface 51L. For example, the upper surface 51U can be flat while the lower surface can be convex. The upper surface and/or the lower surface can face upward so that it can contact a ball 101 moving along the pocket. Optionally, the upper surface 51U can transition directly to a shoulder 41S of the runner that is overmolded over the plug 51. This portion of the shoulder can also be generally convex and/or stepped so that the upper surface 51U of the plug 51 and that shoulder 41S of the runner smoothly transition to one another and provide sufficient engagement with a lacrosse ball 101 traveling along a lacrosse pocket.

As shown in FIG. 6B, the plug 51 can include a projection or flange 51F. This flange can extend radially outward away from the longitudinal axis PLA of the plug 51 between the upper surface 51U and the lower surface 51L. The flange 51F can project outwardly from the side surface 51S. The flange can be located about midway between the respective upper and lower surfaces, or it can be offset closer to one of these two surfaces, depending on the particular application. Further, the flange 51 is shown as a generally continuous structure circumferentiating the plug. In other constructions, it can be in the form of multiple individual and isolated projections extending outwardly from the side surface 51S. In other cases, it can be in the form of multiple threads or ridges extending outward from the side surface 51S of the plug.

FIG. 6A illustrates the flange 51F being overmolded and generally encapsulated by the material from which the first runner 21 is constructed. Generally, the flange 51F can provide additional structural and mechanical attachment of the plug to the material from which the runner is molded. This can prevent the removal of the plug from the surrounding runner structure upon the application of excessive force during use of the pocket.

As shown in FIG. 6B the cross lace 53 optionally can extend outward within a portion of the flange 51F. In this case, the flange itself is molded over at least a portion of the cross lace 53. As also shown in FIG. 6B, the plug 51 can define a bore 51B. This bore 51B can be formed when the cross lace is overmolded by the polymeric material from which the plug is constructed. The bore also can be formed due to pins that project into a mold cavity in which the plug 51 is formed. These pins, as described in further detail below, can anchor and hold the respective ends of the cross lace 53 in position so that when the plug 51 is formed from a polymeric material, it satisfactorily overmolds and bonds directly to the end 53E1 of the cross lace 53.

The cross lace 33 can be a string, lace, cord, web or other elongated member that is comprised of one or more strands of yarn, filament, or other smaller elongated elements. In the embodiment illustrated, the cross lace can be constructed from nylon string. Of course, combinations of different stranded materials such as nylon and Kevlar can be utilized in some constructions. Generally, the cross lace can have a diameter of 1 mm to 4 mm, further optionally 2.5. Other diameters for the cross lace can be utilized depending on the particular application and the forces to be applied to the cross laces.

The bores 51B of the plugs 51 can be constructed so that they are not concealed or molded over by the runners 21 when the plugs themselves are overmolded. For example, as shown in FIG. 6A, the bores 51B can be aligned with a bore 21B that is defined within the upper surface 21U of the respective first runner. The aligned bores 51B and 21B of the respective plug and runner can also provide a viewer V with a visual confirmation that the cross lace 53 is fully molded within the plug and satisfactorily anchored therein. In addition, as shown in FIG. 6A, a portion of the upper surface 51U of the plug 51 extends slightly upwardly above the uppermost surface of the upper surface 21 of the runner. If desired, of course, this upper surface 51U can be generally flush with and transition directly to the upper surface 21U of the runner. In this construction, optionally the upper surface 51U of the plug is generally visible along the upper surface 21U of the runner. To attain this construction, the runner 21 is overmolded over the side 51S and flange 51F of the plug, but not over the entire upper surface 51U of the plug. The same effect can be realized with the lower surface 51L of the plug so that it is visible within the lower surface 21L of the runner 21. This visibility can be enhanced by utilizing contrasting colored material to form respective plugs and runners. Without the contrasting material, colors, it might be difficult to discern the plugs from the runners.

FIG. 6A also illustrates attachment of the cross lace to the plug and runner. Optionally, the cross lace 53 is overmolded by the plug 51 so that the end 53E1 of the cross lace extends at least through the bore 51B of the plug 51. The cross lace further extends outwardly toward the longitudinal axis LA of the pocket, generally toward the second runner 22. The cross lace thus crosses through at least a sidewall 51SW (FIG. 6B) of the plug 51. It also can pass through an inwardly facing sidewall 21SW of the runner as well as an inner surface 21I associated with the outermost extent of that sidewall 21SW. Thus, in traversing toward the longitudinal axis LA, the cross lace 53 can extend through a portion of the plug, the plug as well as a portion of the runner molded over the plug. Because the plug is covered by the overmolded runner on the side of the runner near the longitudinal axis LA, it can appear that the cross lace projects merely from the runner, as the plug is concealed under the sidewall 21SW of the runner. Optionally, in the location where the cross lace extends through the plug sidewall S1SW and the runner sidewall 21SW, two parallel and aligned bores are formed, one within the plug and the other within the runner.

III. Method of Manufacture and Use

A method of manufacturing the lacrosse pocket 10 of the current embodiment will now be described with reference to FIGS. 1-6B, 9, 9A and 10. In general, the pocket 10 is configured, shaped and dimensioned to fit a lacrosse head 100 including opposing sidewalls extending between a scoop 118 and a ball stop 113 as shown in FIG. 1. To manufacture this pocket, different molding techniques, and separate molds with separate materials can be utilized. For example, the cross laces can be joined with respective plugs to form plug units in a first molding process. Those completed plug units can be taken and utilized in a second molding process, in which the plug units are configured as desired within a mold. First and second runners (and any additional runners, if such are desired) can be overmolded over the respective plug units and portions thereof to join those plug units with the runners in a predetermined configuration.

Figure 9:
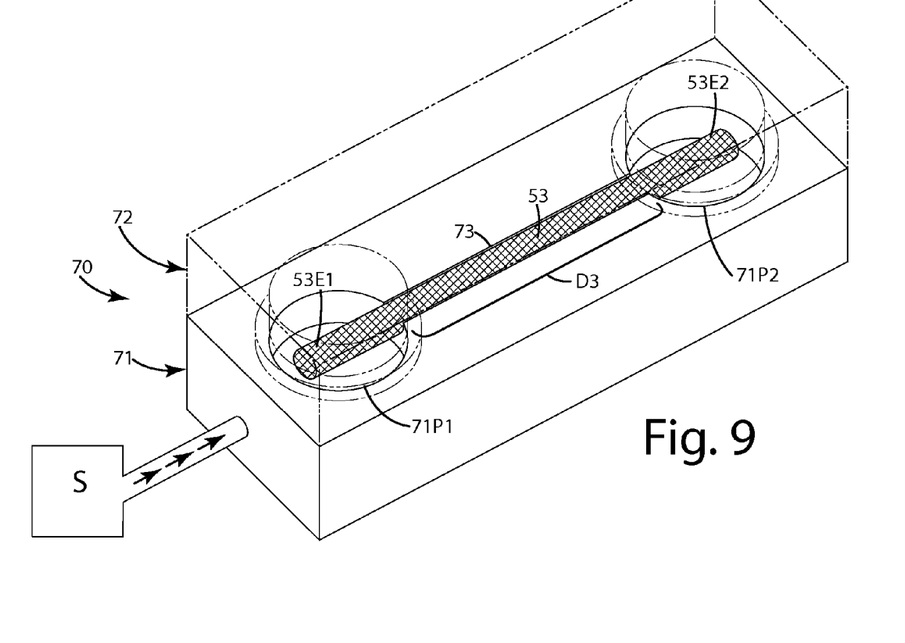
FIG. 9 is a perspective view of a first mold used to make the plug units.
Figure 9A:
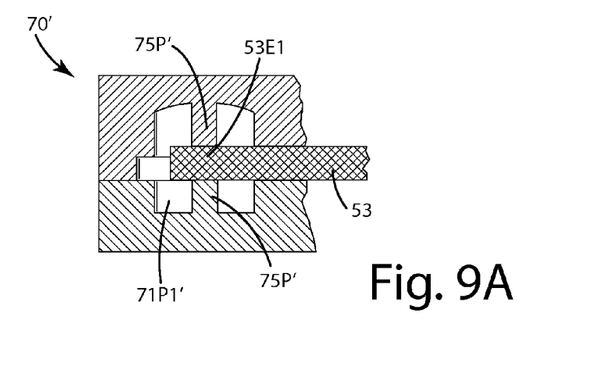
FIG. 9A is a cross section view of an alternative first mold including positioning pins used to make the plug units.

Turning to FIGS. 9 and 9A, a first or plug unit mold 70 is provided. The plug unit mold can include a first mold portion 71 and a second mold portion 72 shown in broken lines. This first mold 70 can define a first plug cavity 71P1 and a second plug cavity 71P2. These plug cavities are spaced a preselected distance D3 from one another. Generally, this distance can correspond to the lengths L1 or L2 or other lengths of the cross laces that are desired to be exposed between the respective plugs in the finished product. The plug cavities 71P1 and 71P2 can include internal surfaces that correspond to the respective external surfaces of a finished plug, for example, those surfaces shown in FIGS. 6A and 6B and described above.

The first mold 70 can include or define a retaining channel 73 extending between the respective plug cavities. This retaining channel 73 can accommodate a cross lace 33 placed within the mold to hold it in a predetermined location, particularly so that the ends 33E1 and 33E2 thereof project satisfactorily into the respective mold cavities 71P1 and 71P2 to achieve a desired bonding of injected material with those ends. The first mold 70 also can include a supply S of a first polymeric material that can be injected into the mold 70.

After the cross lace 33 is satisfactorily placed in the retaining channel, and the ends extend satisfactorily into the respective plug cavities, the first polymeric material is introduced into the cavities 71P1 and 71P2. When this first polymeric material enters the cavities, it can fill them substantially. It also extends over and encapsulates or otherwise overmolds at least a portion of the cross lace 33, and in particular the cross lace ends. The polymeric material introduced in the cavities generally flows within the interstitial spaces between strands from which the cross lace 33 is constructed. It also bonds directly to and impregnates portions of the ends of the cross lace 33.

After the polymeric material is satisfactorily introduced into the cavities to form the respective plugs, the material is allowed to cure, thereby forming a first plug and a second plug in the respective plug cavity and second plug cavity. These plugs are disposed a distance D3 (or L1 or L2) from one another along the cross lace 33. The respective first plug, second plug and cross lace form the first plug unit upon curing. The plug unit 50 can be removed from the first mold 70 and generally will appear as the plug units shown in FIGS. 4-6 and 6B, and will include the features described in connection with those plug units.

Optionally, the first mold 70 can be modified slightly as shown in the alternative construction in FIG. 9A. There, the first mold 70' defines a mold cavity 71P' which is similar to the mold cavity shown in FIG. 9. However, this mold cavity can include additional pins or projections 75P' and 76P'. These pins can extend inwardly from upper and lower portions of the cavity 71P'. They can be of a preselected dimension so that the ends of these pins gage the end 33E1 of the cross lace 33 and pinch it with sufficient predetermined force to hold that end in a fixed location during introduction of the polymeric material into the mold cavity to form the respective plugs. These pins can be cylindrical in shape. Of course, other shapes can be utilized depending on the particular application. Optionally, the pins, when removed from a cured plug, can assist in forming a bore 51B, for example as shown in FIG. 6B.

Further optionally, the molds used herein can be configured to accommodate single cross laces or multiple cross laces. For example, the mold 70 shown in FIG. 9 can be replicated to form an array of identical molds configured to form multiple individual plug units. With this construction, mass production of the plug units can be facilitated. Further, the first mold 70 can be modified to accommodate and form plug units having different lengths between the respective plugs. In this manner, different plug units such as 30 and 50 can be formed having different lengths.

Figure 10:
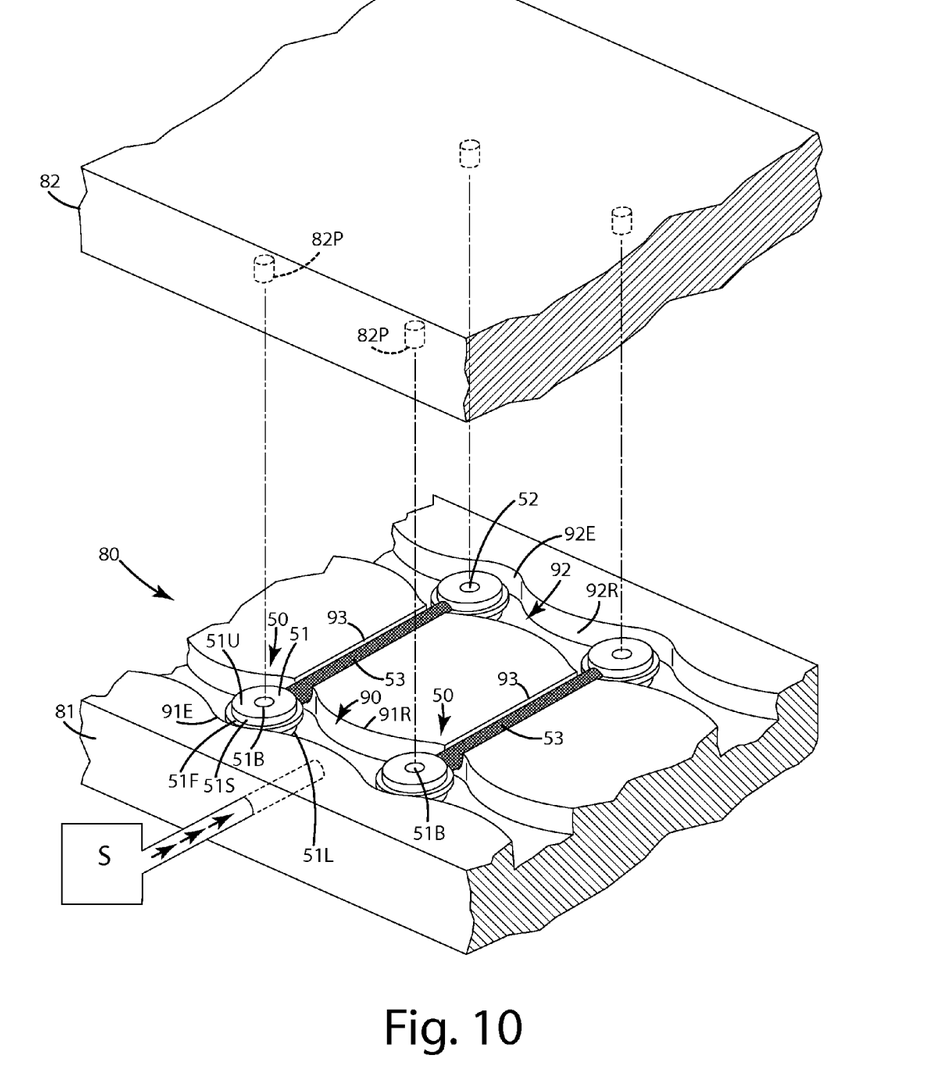
FIG. 10 is a perspective view of a second mold used to overmold the runners relative to the plug units.

Returning to the method of constructing the pocket of the current embodiment after the respective plug units are formed, they can be placed in a second mold 80 as shown in FIG. 10. There, only plug units 50 are illustrated, but of course, other types of plug units such as 30 and 40 can likewise be installed in the mold in respective locations. The plug units 50 are disposed in the second mold 80, with the already formed first plug 51 disposed within a first runner cavity 91. The second plug 52 is disposed in a second runner cavity 92. These plugs can be located in specific enlarged portions 91E and 92E of the runner cavities 92 to accommodate those plugs. Other portions of the runner cavities can be of a reduced dimension, for example, region 91R and 92R can be of smaller dimensions than the enlarged portions 91E and 92E. This can be so that the runner cavity corresponds to the dimensions and shapes of the runners as described above in connection with FIGS. 1-3. The respective cross laces 53 of the already formed plug units 50 can be disposed in retaining channels 93. These retaining channels can help properly position the plugs 51 and 52 within the respective portions of the first and second runner cavities 91 and 92.

After the plug units have been satisfactorily placed, the second mold 80 is closed via the second mold portion 82 being closed against the first mold portion 81 to complete the respective runner cavities. After the mold is closed and the runner cavities are complete, a second polymeric material is introduced from a supply into the second mold 80.

Optionally, the second mold portion 82 and/or the first mold portion 81 can include pins 82P that are configured to fit within the bores 51B of the plugs. This can further assist in centering and precisely placing the plugs within the runner cavities 91 and 92.

With the second mold 80 closed, a supply S of the second polymeric material is introduced into the cavities 91 and 92. This second polymeric material encapsulates the plugs 51 and 52 and a small portion of the cross lace 53 that extends into those cavities. As mentioned above, certain portions of the respective plugs might not be engaged by the material, allowing those surfaces to be exposed in a final product. During the injection process, in the second mold 80, a second polymeric material can substantially engage the side surfaces 51S and flange 51F of the plug 51, but can be restrained from engaging the upper 51U and/or portions of the lower 51L surfaces of that plug 51. Of course, depending on the particular applications, different portions and different surfaces can be engaged by the polymeric material to bond the runners to the plugs. Optionally, the second polymeric material is molten and at a specific temperature. This temperature, however, is insufficient to substantially melt or deform the respective plugs. Thus, the plugs retain their structure even as they are overmolded by the runner material.

After the second polymeric material cures, the second mold 80 is opened. When the pocket 10 is removed from the second mold, the respective cross laces that extend between the first runner and the second runner secure those runners to one another.

Optionally, the second polymeric material used to mold the runners can be different from the first polymeric material used to construct the plugs of the plug units. For example, the second polymeric material can be constructed so that it has a lower melt temperature than the first polymeric material, and/or the first polymeric material has a softer durometer than the second polymeric material. As a further example, the second material of the runner can have a durometer of 60 on the Shore A scale. The first material of the plugs can be 80 to 100, or 50 to 100 on the Shore D scale, or a harder durometer, depending on the application.

Figure 3:
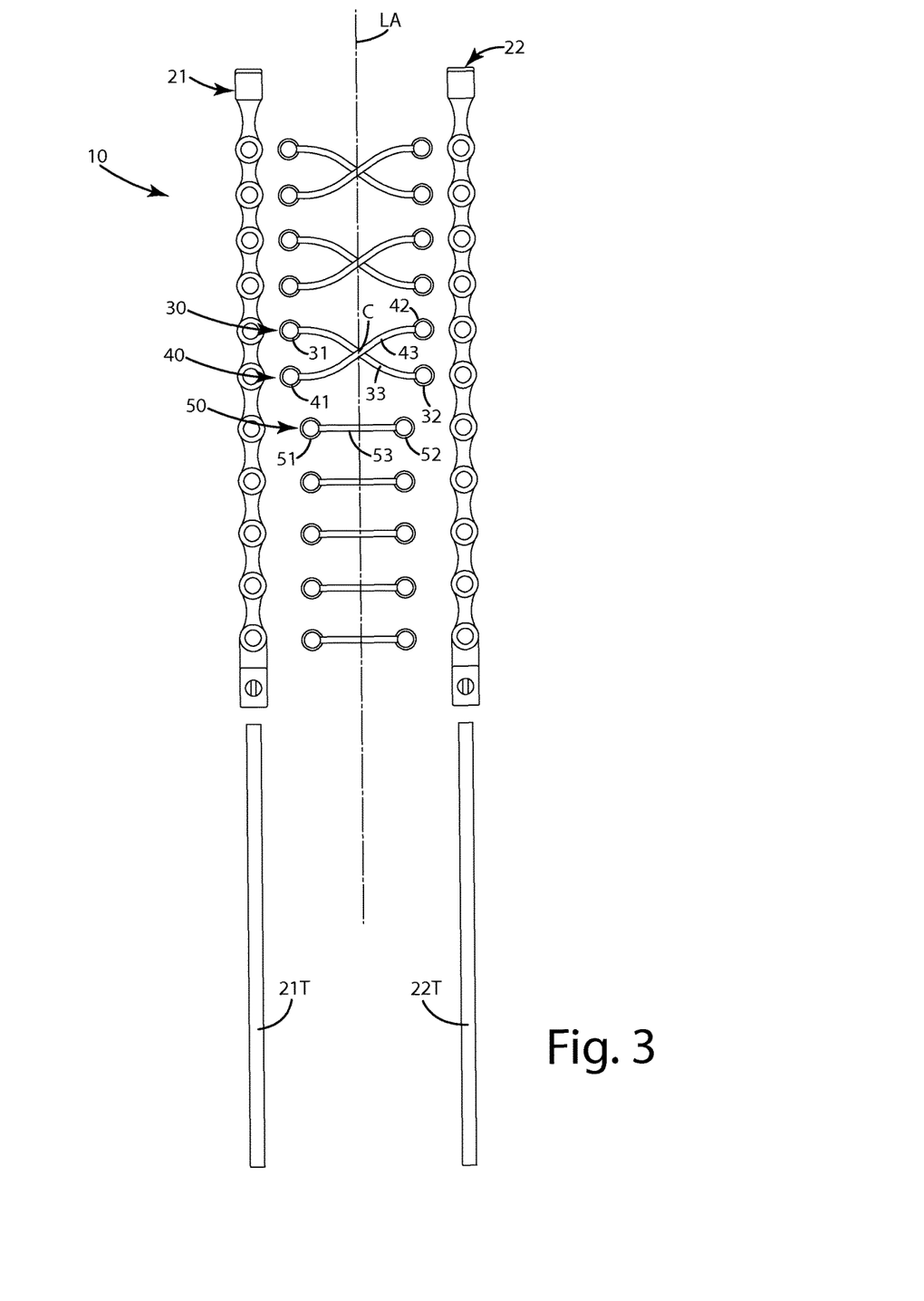
FIG. 3 is an exploded view of the lacrosse pocket illustrating plug units in different configurations.

When the plug units 30 and 40 are placed in the second mold 80, the respective cross laces 33, 43 of those units can be oriented transverse to one another, and specifically can cross over one another. This is illustrated in FIG. 3 where the cross lace 33 crosses over the cross lace 43 at the cross intersection C. In this construction, the plug units 30 and 40 are also configured so that their respective plugs, for example 31 and 32, or 41 and 42, are not disposed diametrically across from one another across the longitudinal axis LA. Instead, a first plug 31 of the first plug unit 30 is disposed diametrically across from the second plug 42 of the second plug unit 40. Likewise, the first plug unit 41 is disposed diametrically across the longitudinal axis LA from the second plug 32 of a second plug unit 30. In this manner, the respective plugs of a plug unit can be offset or staggered from one another along the lengths of the respective first and second runners 21 and 22.

IV. First Alternative Embodiment

Figure 7:
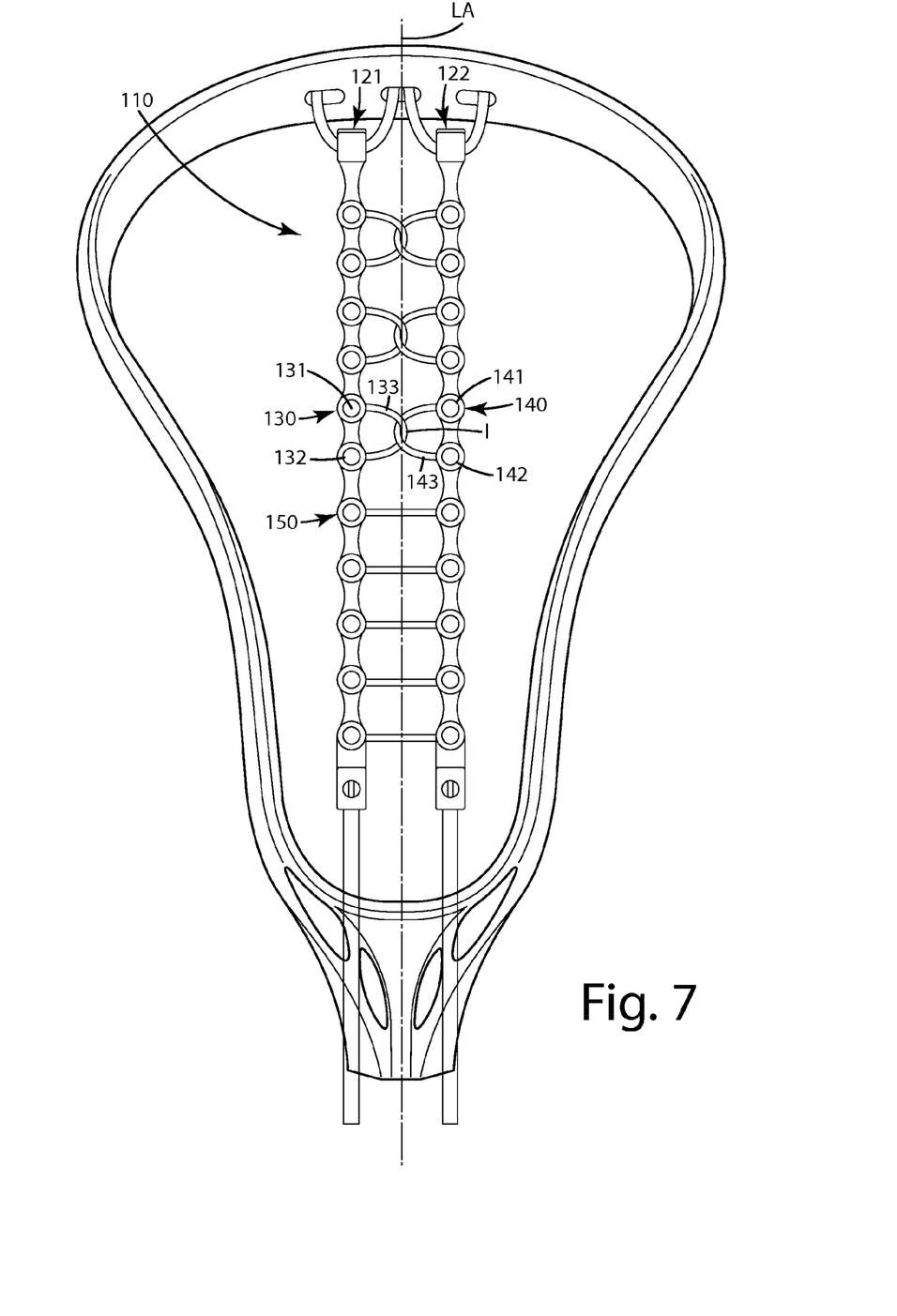
FIG. 7 is a front view of a first alternative embodiment of the lacrosse pocket.
Figure 8:
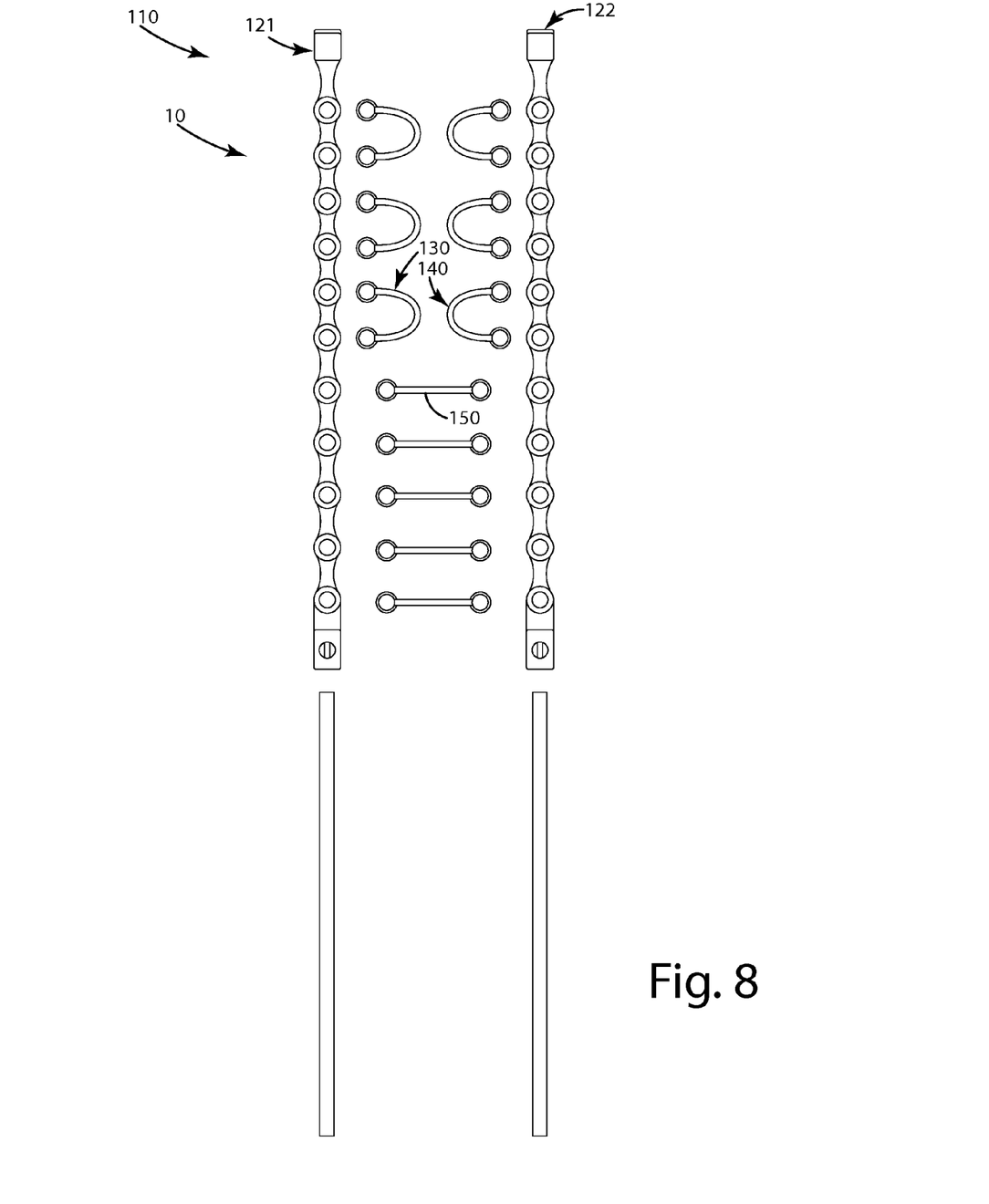
FIG. 8 is an exploded view of the first alternative embodiment of the lacrosse pocket illustrating the plug units in different configurations.

A first alternative embodiment of a lacrosse pocket is illustrated in FIGS. 7 and 8 and generally designated 110. This pocket 110 is generally identical to the pocket of the current embodiment described above with several exceptions. For example, in this embodiment, the pocket 110 includes first 121 and second 122 runners. It also includes one or more different types of plug units 130, 140 and 150. The plug units 150 can be identical to the plug units 50 described in the current embodiment above. In this embodiment, however, plug units 130, 140 are formed so that their cross laces are attached and joined directly with only one of the two runners. For example, the plug unit 130 includes a first plug 131 which is joined with a first cross lace 133. To an opposite end of the cross lace, a second plug 132 is joined. The plugs 131 and 132 of the plug unit 130, however, are consecutively spaced along the length of the runner 121. Thus, instead of one plug being disposed in and overmolded by one runner and another, second plug being disposed in and overmolded by a second runner 122, both of the plugs 131 and 132 of this plug unit 130 are overmolded and disposed within the first runner 121 only. The same is generally true for the second plug unit 140, however, its plugs 141 and 142 are disposed and overmolded by the second runner 122.

These plug units operate to cooperatively join the first 121 and second runners 122. This is achieved by interlooping the cross lace 133 of the plug unit 130 with the cross lace 143 of the second plug unit 140. This construction forms an interloop I located between the first runner 121 and second runner 122, optionally along the longitudinal axis LA. With this type of interlooped cross laces, and particularly the curved or rounded construction of the respective cross laces, those cross laces can elongate upon reconfiguration, thereby enabling the first and second runners to move dynamically away from one another when a force by a ball is exerted upon those runners.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method for manufacturing a lacrosse head pocket comprising:
   providing a first mold defining a first plug cavity and a second plug cavity;
   extending a first cross lace between the first plug cavity and the second plug cavity;
   introducing a first polymeric material into the first plug cavity and into the second plug cavity, the first polymeric material encapsulating at least a portion of the first cross lace within the first polymeric material;
   allowing the first polymeric material to cure, thereby forming a first plug and a second plug in the respective first plug cavity and second plug cavity, the first plug and the second plug being disposed distal from one another along the first cross lace, the first plug, the second plug and the first cross lace forming a first plug unit;
   removing the first plug unit from the first mold;
   placing the first plug unit in a second mold including a first runner cavity and a second runner cavity, so that the first plug is disposed in the first runner cavity and so that the second plug is disposed in the second runner cavity;
   introducing a second polymeric material into the second mold, the second polymeric material encapsulating at least a portion of the first plug and at least a portion of the second plug;
   allowing the second polymeric material to cure, thereby forming a first runner and a second runner, the first plug being disposed in the first runner, the second plug being disposed in the second runner; and
   removing the first runner and second runner from the second mold, wherein the first cross lace extends between the first runner and the second runner, thereby securing the first runner to the second runner.

2. The method of claim 1 comprising:
extending a second cross lace between a third plug cavity and a fourth plug cavity defined by the first mold;
introducing the first polymeric material into the third plug cavity and the fourth plug cavity, the first polymeric material encapsulating at least a portion of the second cross lace;
allowing the first polymeric material to cure thereby forming a third plug and a fourth plug in the respective third plug cavity and fourth plug cavity, the third plug, the fourth plug and the second cross lace forming a second plug unit;
placing the second plug unit in the second mold; and
overmolding the third plug and the fourth plug with the second polymeric material.

3. The method of claim 1 wherein the first cross lace includes a first cross lace end and a second cross lace end distal from the first cross lace end, comprising:
placing the first cross lace end in the first plug cavity; and
placing the second cross lace end in the second plug cavity before introducing the first polymeric material.

4. The method of claim 1 wherein the first plug includes an upper surface, a lower surface and a side surface, wherein during the introducing a second polymeric material step, the second polymeric material substantially engages the side surface, but does not substantially engage the upper surface.

5. The method of claim 4 wherein the upper surface of the first plug is exposed and viewable by a user after the removing step.

6. The method of claim 1 comprising forming a second plug unit, a third plug unit and a fourth plug unit and overmolding at least a portion of the second plug unit, the third plug unit and the fourth plug unit with the second polymeric material to join the second plug unit, the third plug unit and the fourth plug unit with at least one of the first runner and the second runner.

7. The method of claim 6,
wherein the first plug is spaced a first distance along the first cross lace from the second plug,
wherein the second plug unit includes a second cross lace, a third plug and a fourth plug,
wherein the third plug is spaced a second distance along the second cross lace from the fourth plug,
wherein the first distance is greater than the second distance.

8. The method of claim 1 comprising:
forming a second plug unit including a second cross lace, a third plug and a fourth plug; and
crossing the second cross lace with the first cross lace before said introducing the second polymeric material step.

9. The method of claim 1, comprising:
forming the first plug to include an upper surface, a lower surface and a side surface;
extending the first cross lace outward from the side surface;
concealing the side surface with the second polymeric material; and
extending the first cross lace outward from an inner surface of the first runner facing toward a longitudinal axis of the pocket.

10. A method for manufacturing a lacrosse head pocket comprising:
forming a first plug adjacent a first end of a first cross lace;
placing the first plug in a mold;
introducing a polymeric material into the mold, the polymeric material encapsulating at least a portion of the first plug;
allowing the polymeric material to cure, thereby forming a first runner, the first plug being disposed in the first runner; and
removing the first runner from the second mold,
wherein the first plug is joined with the first runner,
wherein the first cross lace extends outward from the first runner.

11. The method of claim 10, wherein the first plug includes a side surface, comprising extending the first cross lace outward from the side surface toward a pocket longitudinal axis adjacent the first runner.

12. The method of claim 11 comprising forming a second plug adjacent a second end of the first cross lace, the second plug being distal from the first plug, wherein during the introducing step, the polymeric material encapsulates at least a portion of the second plug, the second plug being disposed in the first runner.

13. The method of claim 11 comprising forming a second plug adjacent a second end of the first cross lace, the second plug being distal from the first plug, wherein during the introducing step, the polymeric material encapsulates at least a portion of the second plug, the second plug being disposed in a second runner, distal from the first runner.

14. The method of claim 11 comprising:
forming a third plug on a second cross lace;
placing the third plug in the mold, the second cross lace being transverse to the first cross lace;
allowing the polymeric material to cure, the third plug being disposed in the first runner.

15. The method of claim 11 comprising:
forming the first runner with a first thickness and a second thickness greater than the first thickness;
forming the first plug to have a first height, the first height being greater than the first thickness; and
disposing the first plug within the first runner in a region having the second thickness.

* * * * *